United States Patent [19]

Nagahara et al.

[11] Patent Number: 5,831,518

[45] Date of Patent: Nov. 3, 1998

[54] SOUND PRODUCING METHOD AND SOUND PRODUCING APPARATUS

[75] Inventors: Junichi Nagahara, Tokyo; Toshikazu Minoshima, Kanagawa, both of Japan

[73] Assignee: Sony Corporation, Tokyo, Japan

[21] Appl. No.: 776,875

[22] PCT Filed: Jun. 13, 1996

[86] PCT No.: PCT/JP96/01620

§ 371 Date: Feb. 7, 1997

§ 102(e) Date: Feb. 7, 1997

[87] PCT Pub. No.: WO97/00514

PCT Pub. Date: Jan. 3, 1997

[30] Foreign Application Priority Data

Jun. 16, 1995 [JP] Japan .................................. 7-150770

[51] Int. Cl.$^6$ .................................. G08B 3/00; G10L 3/00
[52] U.S. Cl. .................................. 340/384.1; 340/384.4; 395/2.79; 395/2.84
[58] Field of Search .......................... 340/384.1, 384.4; 395/2.79, 2.82, 2.84, 2.69; 381/17, 18, 26, 51, 52, 61

[56] References Cited

U.S. PATENT DOCUMENTS

| | | | |
|---|---|---|---|
| 4,984,177 | 1/1991 | Roadel et al. | 364/513.5 |
| 5,255,326 | 10/1993 | Stevenson | 381/110 |
| 5,337,363 | 8/1994 | Platt | 381/17 |
| 5,386,494 | 1/1995 | White | 395/2.84 |
| 5,519,809 | 5/1996 | Husseiny et al. | 395/2.79 |
| 5,561,736 | 10/1996 | Moore et al. | 395/2.69 |
| 5,594,789 | 1/1997 | Seazholtz et al. | 395/2.84 |

FOREIGN PATENT DOCUMENTS

| | | | |
|---|---|---|---|
| 6-149275 | 5/1994 | Japan | G10K 15/04 |
| 6-250662 | 9/1994 | Japan | G10H 7/02 |
| 7-92981 | 4/1995 | Japan | G10K 15/00 |

OTHER PUBLICATIONS

Shoei Sugawara, InterSpace: Networked Virtual World for Visual Communication, IEICE Trans. Inf. & Sysut., vol. E–77D, No. 12 Dec. 1994 pp. 1344 to 1349.

Nobuko Kato, Akio Okazaki, Natural Operation in Virtual Space Human–Interface–Symposium Transactions, vol. 8th Oct. 1992 , p. 406.

Hiroya Tanigawa, Voice Control Method in Multi–Participatory Type Virtual Environment IEICE Technical Reseach Report vol. 95, No. 181, Jul. 25, 1995, pp. 9–14.

Naoto Oki, VCP: Proposal of Information Environment Using Virtual Space with Voices IPS Transactions, vol. 36, No. 6, Jun. 15, 1995, pp. 1342–1349.

*Primary Examiner*—Brent A. Swarthout
*Assistant Examiner*—Van T. Trieu
*Attorney, Agent, or Firm*—Limbach & Limbach LLP; Seong-Kun Oh

[57] ABSTRACT

In a sound producing apparatus and a sound producing method of this invention, at least underlying sound representing situations of the place within virtually actualized space and ornamental sound corresponding to object within the virtually actualized space which is not independent of presence or absence of display on a display unit are produced to set virtual sound space corresponding to the virtually actualized space displayed on the display unit. Thus, speech (sound) can be utilized as means for grasping spatial information as in the actual world within the virtually actualized space, and offer of information utilizing speech (sound) can be made. In addition, the advertisement effect can be also increased.

44 Claims, 6 Drawing Sheets

SOUND PRODUCING METHOD AND SOUND PRODUCING APPARATUS

DESCRIPTION

Sound Producing Method and Sound Producing Apparatus

TECHNICAL FIELD

This invention relates to a sound producing method and a sound producing apparatus for setting virtual sound space corresponding to virtually actualized (virtual realistic) space displayed on display means.

BACKGROUND ART

In recent years, there are being put into practical use on line network service systems in which client computers and server computers are connected through communication lines, and user accepts offer of various information from the server computers, or receives service such as video viewing/ listening or ordering of goods, etc on the corresponding client computer.

Moreover, in recent years, in the above-mentioned network service system, it has been popularized to beautifully represent the service contents, or to carry out presentation of the concept model (concretely represented picture of abstract data) or metaphor (picture copying actual article) by using, e.g., three-dimensional graphics on the display of the monitor device connected to the client computer to thereby carry out display which is three-dimensional and is close to the actual (realistic) world (i.e., display of the virtually actualized space) to represent the service contents for user.

Meanwhile, in the case of displaying the virtually actualized space on the display of the monitor unit as described above, display by the graphical representation is generally carried out.

However, information that human being acquires (obtains) within the actual world are not limited to visual (sense) information obtained from the eyes, but also include auditory (sense) information obtained from the ears also occupies considerable ratio thereof. On the contrary, within the above-described general virtually actualized space, since only feedback sound with respect to the operation and BGM (Background Music) irrelevant to the content of the virtually actualized space are mainly supported as the elements of the sound (acoustic) space, there are hardly any cases where sound is utilized as spatial information grasping means like the actual world. In this case, the feedback sound with respect to the operation is a sound for informing user that user operation is securely carried out when, for example, user carries out designation operation by a pointing device, etc.

Moreover, since the virtually actualized space is mainly represented on a display (CRT, etc.) connected to the computer, etc., there is generally no means for obtaining information except for the elements displayed on that display.

Further, in the conventional general virtually actualized space, spatial action of virtual user and sound within the virtually actualized space, are not linked, and sound is not utilized as the information for judgment of circumstances.

Particularly, within the virtually actualized space, on the premise that it is used for the network service, attempts to utilize sounds for carrying out attraction by sounds such as a jingle sound, a theme song, or the like within the actual world have not yet been carried out. In addition, attempts to utilize sound for providing information in a manner of interrupt (request) (emergent contact (information) or message, etc.) in the case where there is limitation in the display area of the display have not yet been carried out as well.

This invention has been made in view of such actual circumstances, and its object is to provide a sound producing method and a sound producing apparatus which can utilize sound as spatial information grasping means in a manner as in the actual world within the virtually actualized space, which also permits an offer of information utilizing sound, and which can provide an increased advertisement effect.

BACKGROUND OF THE INVENTION

This invention is directed to a sound producing apparatus adapted for setting a virtual sound space corresponding to a virtual space displayed on a display unit to produce a sound characterized by the provision of underlying sound signal generating means for generating, on the basis of underlying sound parameter, an underlying sound signal indicating situations of the place at a position of the virtual user within the virtual space; an ornamental sound signal generating means for generating, on the basis of ornamental sound parameter, an ornamental sound signal set at object disposed within the virtual space; and a sound producing means for producing a sound on the basis of at least the underlying sound signal and the ornamental sound signal that the underlying sound signal generating means and the ornamental sound signal generating means respectively generate.

The sound producing apparatus of this invention further comprises communication means for making connection to a server computer through a communication line, wherein data of the number of users who are providing access to the server computer is caused to be at least the underlying sound parameter. The underlying sound parameter includes at least a time parameter, and the underlying sound signal includes a signal generated by repeatedly reproducing an underlying phonemic data consisting of a predetermined time length. Further, the underlying sound is set at every area of predetermined units of the virtual space, and the area of the predetermined unit corresponds to one virtual space displayed within a display picture (on screen) of the display unit. Further, the ornamental sound parameter includes at least a distance parameter indicating distance between the virtual user and the object within the virtual space, and/or includes at least a direction parameter indicating direction in which object is disposed with respect to line of sight direction of the virtual user within the virtual space. In addition, the sound producing apparatus of this invention further includes signal (signaling) sound signal generating means for generating, on the basis of a signal (signaling) sound parameter, a signal (signaling) sound signal corresponding to an alarm or a response, and/or announcement sound signal generating means for generating an announcement sound signal having meanings in a language on the basis of an announcement sound parameter.

Moreover, a sound producing method of this invention is directed to a sound producing method for setting virtual sound space corresponding to virtual space displayed on a display unit to produce a sound, the method comprising: an underlying sound signal generating step of generating, on the basis of an underlying sound parameter, an underlying sound signal indicating situations of the place at a position of the virtual user within the virtual space; an ornamental sound signal generating step of generating, on the basis of an ornamental sound parameter, an ornamental sound signal set at an object disposed within the virtual space; and sound producing step of producing a sound on the basis of at least the underlying sound signal and the ornamental sound signal respectively generated at the underlying sound signal generating step and the ornamental sound signal generating step.

Here, the sound producing method of this invention further comprises communication step for carrying out a connection to a server computer through a communication line, wherein data of the number of users who are providing access to the server computer is caused to be at least the underlying sound parameter. Moreover, the underlying sound parameter includes at least a time parameter, and the underlying sound signal includes a signal generated by repeatedly reproducing an underlying phonemic data consisting of a predetermined time length. Further, the underlying sound is set at every area of predetermined units of the virtual space, and the area of the predetermined unit corresponds to one virtual space displayed within a display picture (on screen) of the display unit. Further, the ornamental sound parameter includes at least a distance parameter indicating the distance between the virtual user and object within the virtual space, and/or includes at least a direction parameter indicating the direction in which the object is disposed with respect to a line of sight direction of the virtual user within the virtual space, In addition, the sound producing method of this invention also further includes a signal (signaling) sound signal generating step of generating a signal (signaling) sound signal corresponding to an alarm or a response on the basis of a signal (signaling) sound parameter, and/or an announcement sound signal generating step of generating an announcement sound signal having meanings in a language on the basis of an announcement sound parameter.

Namely, in accordance with this invention, at least the underlying sound representing situations of the place within the virtual space and the ornamental sound corresponding to the object within the virtual space which is independent of the presence or the absence of the display on the display unit are produced, thus to set the virtual sound space corresponding to the virtual space displayed on the display unit.

DETAILED DESCRIPTION OF THE INVENTION

Preferred embodiments of this invention will now be described with reference to the attached drawings.

Prior to describing the more practical content of this invention, the entire system of an embodiment of this invention will now be described with reference to FIGS. 1 and 2.

Figure 1:
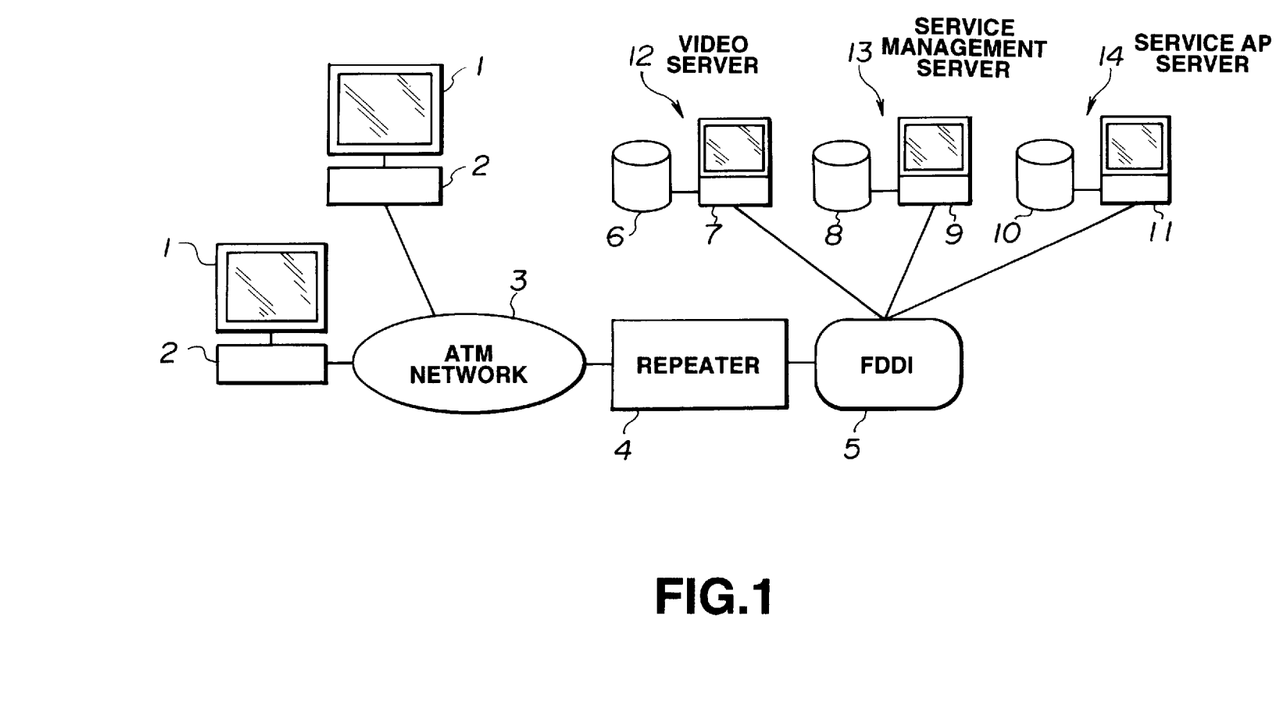
FIG. 1 is a view showing the entire configuration of the system in an embodiment of this invention.

In FIG. 1, client computers 2 are connected to, e.g., a service management server 13, a video server 12 and a service AP server 14 of the service supply side through a large-scale ATM (Asynchronous Transfer Mode) network 3, a repeater 4 and a FDDI (Fiber Distribution Data Interface) section 5. In this case, the ATM refers to the asynchronous transfer mode. In this ATM, transmit data is divided into a fixed length data of 48 byte units in a manner independent of the kind of data for a header of 5 bytes including address information of data transmission destination added to the fixed length data to transmit data in units called a "cell" of 53 bytes in total. The cells which have been sent to the ATM network 3 are subjected to switching by the ATM switch on the basis of a header information. Then, the corresponding cell which has arrived at the target receiving side terminal is restored (reconstructed) into the original data on the basis of the header information. This ATM network 3 is characterized by providing the ability to transfer speech, moving picture and/or computer data in a mixed state. In addition, the FDDI 5 is a medium access system of the token passing system of 100M bits/sec. using optical fiber.

The video server 12 is composed of a server computer 7 and a data storage unit 6 consisting of, e.g., a hard disc or an optical disc, etc. Within the data storage unit 6. digital video data and/or digital audio data which have been processed into data of, e.g., format of MPEG, etc., which will be described later are stored. From the data storage unit 6 of the video server 12, the digital video data or the digital audio data corresponding to a request of the client computer 2 is read out. The data thus read out is transferred to the client computer 2.

The service AP server 14 is similarly composed of a server computer 11 and a data storage unit 10. Within the data storage unit 10, data or script which provides the basis of a three-dimensional picture is stored as an application program (AP) data. From the data storage unit 10 of the service AP server 14, the application program data, etc. is read out in accordance with the request of the client computer 2. The data thus read out is transferred to the client computer 2.

The service management server 13 is similarly composed of a server computer 9 and a data storage unit S. This service management server 13 accepts the request from the client computer 2 to carry out management of the video server 12 or the service AP server 14 in accordance with the request.

In this case, plural servers may be respectively provided as the video server 12 or the service AP server 14. In addition, respective servers 12, 13, 14 may be combined into a single server.

In the case of carrying out data transfer from such servers to the client computer 2, a request is first transmitted from the corresponding client computer 2. The request thus transmitted is transmitted to the server side through a unit for carrying out protocol conversion and data automatic distribution/data transfer rate (speed) conversion, etc. called repeater 4 and the FDDI interface section 5 passing through the ATM network 3.

From the server side, data is taken out in accordance with the request of the client computer 2. The data thus taken out is transmitted to the client computer 2 side passing through the FDDI interface section 5, the repeater 4 and the ATM network 3. The data transmitted from the server side is caused to undergo a processing for display by the client computer 2, and the data thus obtained is displayed on the display of a monitor unit 1. Thus, a user interface using graphical display, i.e., Graphical User Interface (hereinafter referred to as GUI) is constructed. Namely, the client computer 2 is operative on the basis of the operation of the user carried out in correspondence with the graphical display on the display of the monitor unit 1. By this operation, an offer of service with respect to user is realized.

Figure 2:
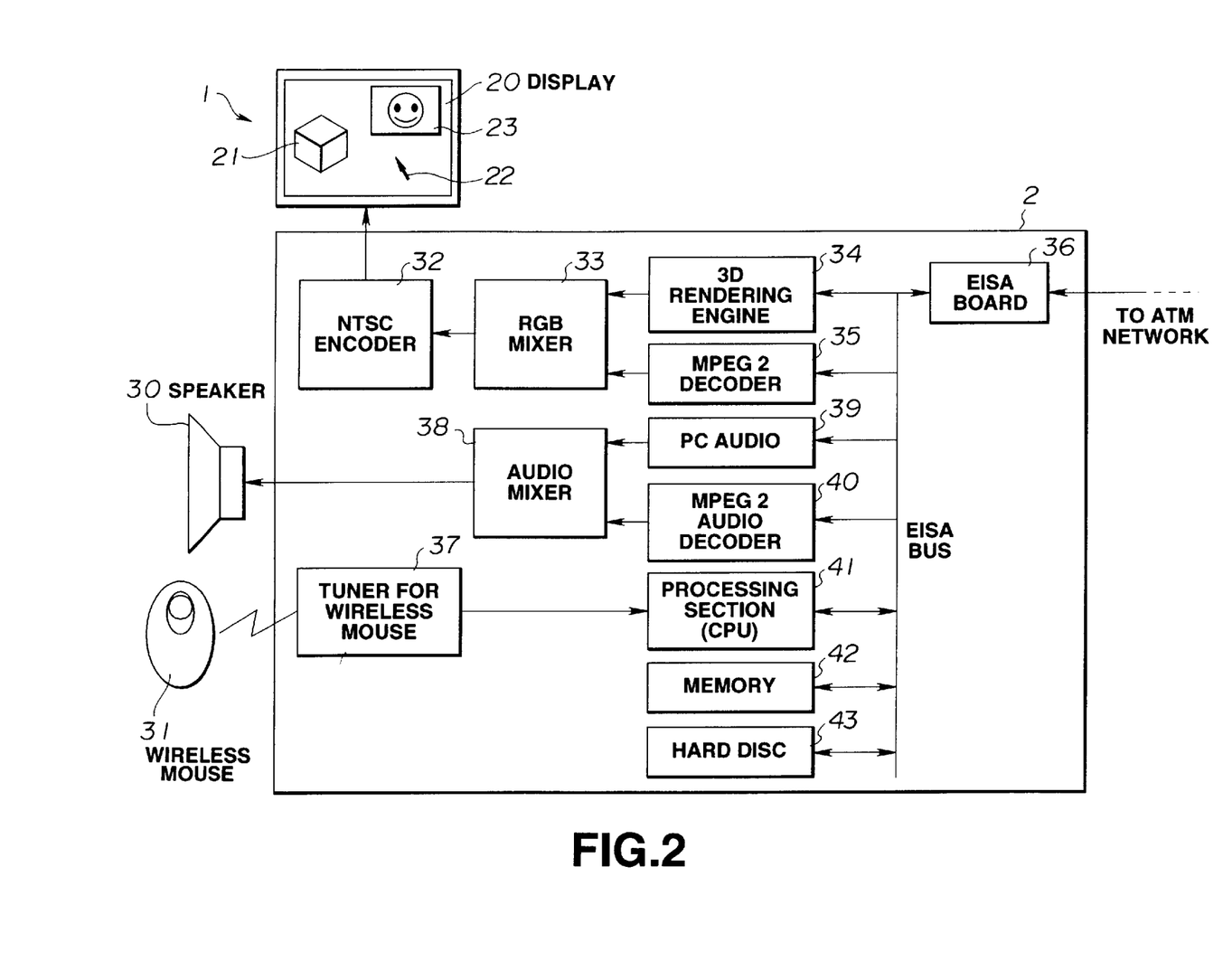
FIG. 2 is a block circuit diagram showing a more practical configuration of a client computer of the embodiment of the present invention.

Further, the configuration of the client computer 2 itself shown in FIG. 1 is as shown in FIG. 2, for example.

In FIG. 2, an EISA (Extended Industry Standard Architecture) board 36 is a board for communication which connects the client computer 2 and the ATM network 3. In this case, signals delivered to the EISA board 36 through the ATM network 3 are once stored onto a hard disc 43 of which write/read operation is controlled by a processing section 41, and are then read out therefrom in accordance with the type of data. The signals thus read out are respectively sent to corresponding ones of a three-dimensional rendering engine 34, a MPEG (Moving Picture Experts Group) 2 decoder 35, a PC audio decoder 39, and a MPEG 2 audio decoder 40, etc.

The 3D rendering engine 34 is a coordinate transform element for transforming a three-dimensional coordinate data of a three-dimensional object delivered from the server side as data which provides the basis of the a three-dimensional picture into two-dimensional coordinate data for the purpose of displaying such data on a display 20 of the monitor unit 1, and is provided for realizing construction of GUI corresponding to the application software. Namely, since even if the corresponding object is a three-dimensional object, it can be only two-dimensionally displayed on the display 20, the 3D rendering engine 34 transforms the three-dimensional coordinate data of the a three-dimensional object into two-dimensional coordinate data adapted to be displayed on the display 20.

The MPEG 2 decoder 35 is a decoder for expanding digital video data compressed by the standard of the MPEG 2. In this case, the MPEG 2 is the international standard (specification) for compression/expansion technology of moving picture.

A RGB mixer 33 mixes data from the 3D rendering engine 34 and video data from the MPEG 2 decoder 35 so that they can be displayed at the same time on the display 20.

Since video data from the RGB mixer 33 is a component video data consisting of R (Red), G (Green) and B (Blue) of three prime colors of light, a NTSC encoder 32 converts the component video data into a composite video signal of the television standard (specification) of, e.g., NTSC (National Television System Committee). It is to be noted that in the case where the monitor unit 1 corresponds to any other television standard (specification), e.g., PAL (Phase Alternate Lines) or SECAM (Sequential Couleur Avec Memoire), etc., the encoder 32 is caused to be an encoder corresponding thereto.

A picture image corresponding to the video signal from the NTSC encoder 22 is displayed on the display 20 of the monitor unit 1. In this case, a pointer 22 by a pointing device, a picture (pictorial image) 23 obtained by decoding video data of MPEG 2 and a picture for the GUI (e.g., three-dimensional or two-dimensional picture 21) by the 3D rendering engine 34 are displayed on the display 20 of the example of FIG. 2. In addition, the picture generated from video data of the MPEG 2 and picture for the GUI may be displayed in the state where they are synthesized.

On the other hand, the PC audio decoder 39 produces (generates), e.g., a sound effect by using an ADPCM (Adaptive Differential Pulse Code Modulation) sound source. Moreover, the MPEG 2 audio decoder 40 expands the compressed audio data of MPEG 2. The data from the PC audio decoder 39 and the data from the MPEG 2 audio decoder 40 are mixed by an audio mixer 38 so that an analog audio signal is provided. The audio signal thus obtained is sent to a speaker 30 as sound producing means. The PC audio decoder 39, the MPEG 2 audio decoder 40 and the processing section 41 constitute the main part of the sound signal generating means according to the sound producing apparatus of this invention. It is to be noted that in regards to the output sound from the speaker 30, stereo speech or multi-channel speech is desirable. Since, in recent years, even with respect to the stereo speech, systems adapted for controlling phase difference of sound, etc. so that sound image can be caused to three-dimensionally undergo localization have appeared, such systems may be utilized.

Moreover, in the GUI using display on the display 20, input from the user is carried out by a wireless mouse 31 which is one example of the pointing device. The client computer 2 carries out control for the GUI on the basis of a point information transmitted from the wireless mouse 31 in accordance with the user input operation.

More practically, the point information transmitted from the wireless mouse 31 is received by a tuner 37 for the wireless mouse 31. The point information thus received is sent to the processing section 41. This processing section 41 comprises a CPU (Central Processing Unit). Namely, the processing section 41 controls respective components through a bus on the basis of a program data held in a program ROM of a memory 42 having the function of the program ROM and a work RAM, and carries out the control of the GUI on the basis of the point information from the wireless mouse 31. In addition, the processing section 41 serves to carry out (processing for) communication with the computer of the server side as the occasion demands.

It is to be noted that, as the pointing device, not only the wireless mouse 31 but also various tools, e.g., ordinary mouse, track ball, joy stick and so called touch panel in which coordinate position on the display 20 and coordinate position on the panel are in correspondence with each other may be used. Moreover, while the example where the 3D rendering engine 34 and the MPEG 2 decoder 35, etc. are respectively provided as independent chips is disclosed in the example of FIG. 2, the processing section 41 may carry out, by software, various signal processing by these components.

The more practical operation of service providing on-line with respect to user in the case where system of FIGS. 1 and 2 as described above is used will be described below.

Initially, in the case of connecting, on the network, the client computer 2 and the computer of the server side (the computer 9 of the service management server 13 in this case), when connection designation operation by the pointing device is given from the user, the client computer 2 carries out a connection to the computer 9 of the service management server 13 of the server side through the network. Further, when an input of request for offer of information by the pointing device is given from the user, the client computer 2 sends out a request to designate information which is desired to be offered with respect to the computer 9 of the service management server 13 of the server side.

The computer 9 of the service management server 13 of the server side is operative so that when the request is delivered from the client computer 2 through the network, it controls the video server 12 and/or the service AP server 14 in accordance with the request to thereby transfer data and software which will be described below to the client computer 2. Namely, in order to realize a service offer using the virtually actualized space, e.g., script describing behavior within the virtually actualized space, three-dimensional coordinate data of the virtually actualized space, speech data of the virtually actualized space, script describing selection of instructions with respect to the user from the client computer 2, etc., and various data required for processing are transferred from the server side.

The client computer 2 once records, onto the hard disc 43, the data received from the computer of the server side thereafter to present, to the user, virtually actualized world generated on the basis of the data and the software received from the server side by using the picture of the display 20 of the monitor unit 1 or speaker 30, etc. as occasion demands.

The user instructs movement direction, etc. by using the pointing device while carrying out viewing/listening of the virtually actualized world presented by the client computer 2 to wander within the virtually actualized world to operate an operation button, etc. provided at the pointing device to carry out an action with respect to objects or facilities within the virtually actualized world to thereby accept the offer of service.

Namely, the client computer 2 responds by a view point position, a line of sight direction, a speech and movement or a behavior of an object within the virtually actualized space in correspondence with the operation of the pointing device by the user in accordance with the script to present, to the user, a virtually actualized world by using the display 20 of the monitor device 1 and the speaker 30 as if the user enters the inside of the virtually actualized space. In addition, the client computer 2 also carries out an offer of various information, speaking or order of goods (article) with the respect to the user in accordance with the description of the script.

The server computer sends back to the client computer 2 data of the service content corresponding to the request from the client computer 2 based on the operation by the user. Thus, the user can accept the offer of service.

As described above, in the system of this embodiment, the client computer 2 makes a connection to the server computer by using a cable, a communication line or a network, etc. in accordance with the operation of the user thus to realize an offer of service on-line. Here, in the case where the user accepts the service, e.g., offer of information, video viewing (/listening) or order of goods, etc., the system of this embodiment serves to carry out a three-dimensional graphical display of the virtually actualized space, e.g., virtual town space (Town Metaphor) as the concept model (concretely represented picture of abstract data) and/or metaphor (picture copying actual article) representation for the user on the display 20 of the monitor unit 1 connected to the client computer 2, and to further provide service content in a form close to the form where not only visual information but also auditory information can be utilized in a manner similar to the case where the user actually accepts service, etc., within the actual world to thereby permit realization of an interface close to the operation within the actual world of the user, and to facilitate the user to understand, from a conceptual point of view, the relationship between the service that the server provides and the user.

In this embodiment, structured sound method like Sound Scape design technique which will be described later is carried out within the virtually actualized space to thereby construct realistic virtual sound space closer to the actual world. In the embodiment of this invention, the processing section 41 of the client computer 2 calculates a mutual distance between an object or a sound production source and a virtual user and/or an interference action of sound within the virtually actualized space to reflect these quantities as a reproduction parameter in producing sound within the virtually actualized space, thus permitting the user to easily grasp the space by sound. In this case, the object mentioned above is the@concept in which segment which is logical set of programs or data is generalized and is the object accessed by computer.

Moreover, Sound Scape is the concept for grasping the music environment by inclusive frame, which was proposed by R. Murray Schafer of the modern musical composer/ musical educator in Canada. The Sound Scape is coined (formed) from a landscape (landscape grasped by the eye), and is a compound of "sound" and to- "scape" of the suffix which means "- - - scene/view". Namely, this Sound Scape means sounds peculiar to respective communities, e.g., natural sound such as wind or running (flowing) water, sound of traffic, or sound of siren or bell, etc., (wide variety of sounds surrounding our life), i.e., "landscape" of sound (landscape grasped by sound). The concept of the Sound Scape totally grasps the world of sound in a manner to transcend the conventional frame of "music" and "noise", thus permitting more variety of acquaintance (friendship) with sound. Namely, the conceptual region of the sound scape is a new interdiscipline belonging to an intermediate zone of science, society and art. As a key word of sound to be synthesized, an underlying sound (sound continuously heard), a signal (signaling) sound (sound consciously heard) and a marking sound (common sound) are enumerated. Further, the creative activity signifying how the landscape of sound and the human being are caused to be concerned with each other is called "Sound Scape Design". The WSP (World Soundscape Project) founded in 1971 with Schafer playing the most active part developed the Sound Scape Design. The design in this case is not confined only to merely create sound, but also includes creative activity (i.e., making of design) extending over all regions relating to the human being and sound scape.

In this embodiment, way of thinking of ordinary Sound Scape Design as described above is extended to classify sounds produced in introducing the user within the virtually actualized space in a form effective for service on the network. Namely, in the ordinary Sound Scape Design. classification/analysis with respect to sound of the actual world is conducted to make an arrangement in a form of the underlying sound (sound continuously heard), the signal (signaling) sound (sound consciously heard) and the marking sound (sound heard as common property of the community) as the key word. To the contrary, in this embodiment, a scheme is employed to classify those sounds into an underlying sound, an ornamental sound, a signal (signaling) sound and an announcement sound as shown in the Table 1 as classification within the virtually actualized space of the computer base to allot roles to these sounds.

TABLE 1A

| KIND OF SOUND | CONTENTS OF SOUNDS | PARAMETERS |
| --- | --- | --- |
| UNDERLYING SOUND | SOUND REPRESENTING SITUATIONS OF PLACE WITHIN VIRTUALLY ACTUALIZED SPACE | KIND AND SITUATIONS OF WORLD TIME, DATE (SEASON) NO. OF USERS PROVIDING |

TABLE 1A-continued

| KIND OF SOUND | CONTENTS OF SOUNDS | PARAMETERS |
| --- | --- | --- |
| | (ENVIRONMENTAL SOUND) MPED AUDIO DATA ADPCM AUDIO DATA SAMPLING RATE (11–22.05 kHz) LOOPING REPRODUCTION | ACCESS TO SERVER |
| ORNAMENTAL SOUND | SOUND CORRESPONDING TO OBJECT WITHIN VIRTUALLY ACTUALIZED SPACE (BGM OF DEPARTMENT STORE OR SHOP WITHIN VIRTUALLY ACTUALIZED SPACE) STEREO SOUND | DISTANCE BETWEEN VIRTUAL USER AND OBJECT, AND ITS DIRECTION PANNING OPERATION |

TABLE 1B

| KIND OF SOUND | CONTENTS OF SOUND | PARAMETERS |
| --- | --- | --- |
| SIGNAL SOUND | ALARM OR RESPONSE SOUND (SOUND FOR PAYING ATTENTION TO USER) ADPCM SOUND (MONORAL SOUND) SAMPLING RATE (11–22.05 kHz) DURATION (1–2 sec) | CLICK BY POINTING DEVICE OCCURRENCE OF EVENT (ARRIVAL OF MESSAGE, etc.) |
| ANNOUNCEMENT OF SOUND | SPEECH OF AGENT WITHIN VIRTUALLY ACTUALIZED SPACE SPEECH HAVING MEANINGS IN LANGUAGE, e.g., ANNOUNCING VOICE WITHIN SHOP | SET TIME, etc. ACCESS FROM SERVER CONTACT FROM SERVER |

In Table 1, the underlying sound is a sound representing situations of the place within the virtually actualized space, i.e., sound which provides the base (basis) for corresponding environment, which is called "environmental sound". For example, the hum of voices within a department store (there are about three kinds of states of the considerably crowded state, the ordinarily crowded state and the not crowded state in dependency upon the number of users who are providing access to the server), the sound when a user is outside the department store (e.g., sound produced when automotive vehicle runs (travels), etc.), the sound of the atmosphere within the shop (e.g., BGM put on the air within the shop or conversation between a clerk and other customer, etc.), and the like.

In this embodiment, with respect to respective worlds which will be described later as areas of predetermined units within the virtually actualized space, one to several kinds of underlying sounds are provided. Thus, correspondence between the respective worlds and the underlying sounds takes place by situation parameters of the respective worlds. By this correspondence, any one of the underlying sounds prepared is produced. It is to be noted that the above-mentioned world is the area handled as a unit of sets displayed on the display 20 as the virtually actualized space. For example, the entirety of a town (city) including a shop or a building, the inside of one shop, the inside of a certain floor of the building, the inside of the room, the external world in the case where the outside is viewed from the inside of the building, and the like which are represented as the virtually actualized space are areas which constitute the respective worlds. Accordingly, in cases where, for example, two worlds are adjoining as in the case of shops adjacent to each other, even if only one world (one shop in this case) is displayed on the display 20, the underlying sound of the other world (the other shop) would be heard although to a lesser degree. Further, quantities of data constituting the respective worlds are different in dependency upon the kind of respective worlds. In the case where the client computer 2 provides data access to the server side, there are instances where, in dependency upon quantities of data of the respective worlds, data corresponding to one world is accessed, data corresponding to plural worlds is accessed, data corresponding to one world is stored into the memory of the client computer 2, or data corresponding to plural worlds is stored thereinto. Moreover, as the situation parameter, e.g., time, date (season), the number of users who are providing access to the server (crowded, ordinary, or not crowded, etc., as previously described), kind of worlds (e.g., interior or exterior), and the like are conceivable. By the parameter indicating the kind of the world, BGM in the underlying sound is selected. It is to be noted that BGMs in this case are put on the air relatively in a manner of environmental representation (presentation) within the respective worlds unlike, for example, BGM put on the air in the shop as music within the virtually actualized space (which is classified into the ornamental sound), and are, e.g., hum of voices or conversation (speech) between (store) a clerk and a customer, etc.

Moreover, the situation parameters of time and date (season) are used, thereby making it possible to effectively switch the previously described BGM in the underlying sound. For example, within the outdoor world, in the rainy season, sound of rain can be produced.

Further, the underlying sound may be the above-mentioned MPEG audio data or the above-mentioned audio data of ADPCM. In this case, the underlying sound is essentially required to satisfy the condition where reproduction of several seconds can be carried out, and the so-called looping to repeatedly and continuously reproduce the underlying phonemic data consisting of a predetermined time length can be carried out. It is to be noted that although occupation degree such that audio data occupies of the capacity of the memory 42 can be suppressed by carrying out the looping, since, in the case of, e.g., sound of short time (less than 1 sec.), the user cannot recognize its existing portion, and thus, it is necessary to store, in the memory 42, audio data sufficient to enable production of sound of several seconds. Moreover, since the underlying sound is the environmental sound, there is less necessity of high sound quality. Accordingly, the sampling rate in generating audio data of the underlying sound is not required to be high. It is sufficient that the sampling rate of the underlying sound be about 11 kHz–22.05 kHz although depending upon the kind of the sound source.

It is to be noted that in such cases that, for example, a virtual user moves from a certain world to another world within the virtually actualized space, the underlying sound that the world after movement has is selected by the situation parameter of that world, and the reproduction is thus started. Moreover, the timing for stopping the sound of the former (previous) world at the time when the world is switched in this way is the timing when the user causes action such as clicking of an object serving as the key for executing movement processing, etc., in order to move from a certain world to another world. Further, it is desirable that in the case where the virtual user shifts (moves) from a certain world to another world, the sound of the former (previous) world is caused to undergo a fade-out and the sound of the latter (current) world is caused to undergo a fade-in.

The ornamental sound is a sound corresponding to an object within the virtually actualized space, and is, e.g., BGM produced or put on the air in the department store, BGM produced or put on the air in the respective shops, or the like within the virtually actualized space. This ornamental sound can be freely (desirably) set by representation of the service provider. The underlying sound indicates the situation of "corresponding place" and is a sound being produced when the virtual user enters that place, whereas the ornamental sound is a sound produced from object existing at the corresponding place, or the point prescribed (specified) as the sound source. Namely, in the case of the ornamental sound, parameters such as sound volume and/or panning, etc., vary in dependency upon the distance between the virtual user and a certain object, or a direction thereof. It is to be noted that the term "panning" ordinarily refers to the operation for a swinging camera, etc., in left and right directions, but the "panning" referred to here indicates a change of direction of a user with respect to a certain object. In the case of the ornamental sound, the audible direction thereof is also varied by the panning. Further, as a method of changing the ornamental sound, there may be employed a method of merely varying the distance and the sound volume in a manner to correspond to each other (this can be made even by a monoaural sound), or a method of changing the panning and the sound volume in a manner to interlock with each other in dependency upon the direction in which the user is directed (only stereo sound), and the like. In addition, the ornamental sound also includes sound produced from an object within the virtually actualized space, which is not displayed on the display 20. Thus, the user can recognize the direction of the object which is not displayed on the display 20, and estimate (suggest) its direction as well.

The signal (signaling) sound is a response (answering) sound produced in a manner corresponding to an alarm or, e.g., the operation of the user, and is a sound for paying attention to the user. Namely, this signal sound is a sound produced, e.g., when any event takes place. This signal sound is. e.g., the sound of a pager for informing the user of arrival of a message by electronic mail addressed to the user, etc., a response sound for providing feedback to the user by a sound that user operation such as designation, etc by the pointing device is securely carried out, or the like. This signal sound is the sound by the ADPCM, and is produced, e.g., for about 1 to 2 seconds as a monoaural sound of 11.5 kHz~22.5 kHz. In addition, the timing for reproducing the signal sound is the timing when the user clicks the object by the pointing device, the timing when the event takes place, or the like.

The announcement sound is a speech (sound) of the agent or a speech (voice) having meanings in a language such as an announcing voice within the shop, etc., within the virtually actualized space. In addition, this announcement sound is a speech (sound) for informing the user that access from the server side has been provided, or a speech (sound) for notifying information matter (matter to be contacted) from the server to the user by speech (voice).

It is to be noted that, in addition to the above-described sounds, when a video image such as a movie, etc., provided by the service is being reproduced, there is a sound of a corresponding movie, etc. When the video image is being reproduced as stated above, the above-described respective sounds are essentially in a stop state.

In this embodiment, respective sounds obtained by extending the way of thinking of the Sound Scape Design as described above are used to construct a virtual sound space as described below.

Figure 3:
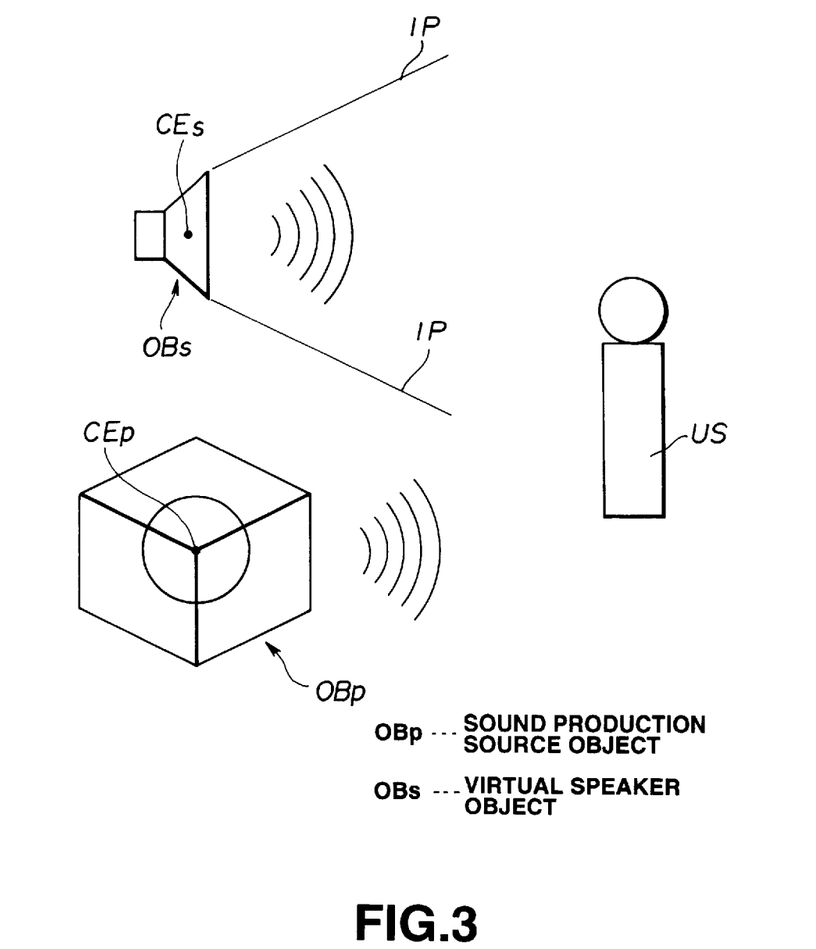
FIG. 3 is a view explaining an object as a sound production source within the virtually actualized space.

Namely, in the system to which the sound producing apparatus of this embodiment is applied, as shown in FIG. 3, within the virtually actualized space, in addition to a virtual speaker object $OB_s$. that the user can visually recognize, an object $OB_p$ of a sound production source is defined as well as a layer which cannot be seen from the virtual user US. The object $OB_p$ of the sound production source is defined as a model, e.g., by a three-dimensional space design tool, etc., for constructing the virtually actualized space, but, when actually programmed, only the center of gravity position information $CE_p$ of the object $OB_p$ is utilized as data. Thus, it becomes possible to set, within the virtually actualized space, an object which is not displayed on the display 20, but is caused to undergo predetermined processing. It is to be noted that while, in the case of the three-dimensional model, data of center of gravity coordinates of polygon is used for the judgment of positional relationship of an object at the time of rendering of the three-dimensional picture, the center of gravity coordinate data of the polygon may be used also as the center of gravity position information. Similarly, also in the case of the virtual speaker object $OB_s$, coordinate position, etc., on the three-dimensional picture of the virtual speaker object $OB_s$ may be used as the data of the sound source position of the corresponding ornamental sound. For example, in the case of the three-dimensional model, similarly to the underlying sound, the data of center of gravity coordinates of polygon used for judgment of the positional relationship of the object at the time of rendering of the three-dimensional picture may be used as the data of the sound source position of the corresponding ornamental sound. In addition, since the virtual speaker object $OB_s$ that the user can visually recognize is represented as a speaker having directivity as shown in FIG. 3, data indicating directivity of sound is also utilized as indicated by IP in FIG. 3 in addition to the center of gravity position information $CE_s$ with respect to the virtual speaker object $OB_s$.

As described above, at the processing section 41 of the client computer 2 of this embodiment, respective sounds such as the underlying sound, the ornamental sound, the signal (signaling) sound and the announcement sound, etc., are controlled on the basis of respective parameters.

Figure 4:
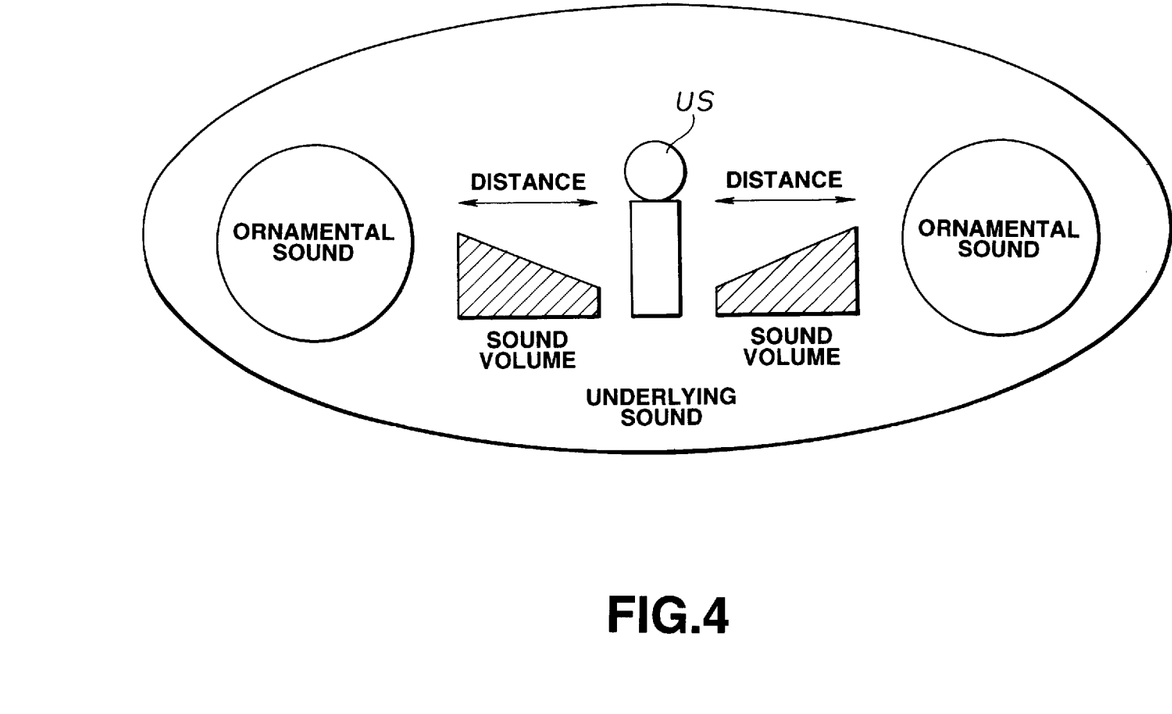
FIG. 4 is a view explaining the concept of an underlying sound and an ornamental sound.

Explanation of the control operation based on respective parameters in the respective sounds will now be given with reference to FIG. 4. In the example of FIG. 4, the relationship between the underlying sound and the ornamental sound is illustrated.

Namely, in FIG. 4 mentioned above, since the underlying sound is essentially a sound representing environment, great change of localization, etc. (the localization referred to here is the place where the underlying sound is produced within the virtually actualized space) is not caused to take place from an essential point of view within one world. It is to be noted that in the case where a change of situations take place (e.g., when the number of users who are providing access to the server which provides services is increased so that frequency of offer of service becomes high), or at the boundary (border) line between a corresponding world and the next world, the underlying sound produced is varied, or underlying sounds are mixed to some degree to thereby enhance the realistic feeling.

Moreover, there are many instances where the ornamental sound is essentially caused to be produced from a certain object. In the case of the ornamental sound, the data of coordinates of the sound source position of the ornamental sound and the coordinate data of the view point of the virtual user US are compared with each other to carry out the control of the sound on the basis of the comparison result. For example, a predetermined conversion formula is caused to apply to the relationship between sound volume of the ornamental sound and the distance from the sound source position of the ornamental sound up to the virtual user US. In a more practical sense, a relationship such that the sound volume becomes smaller inversely proportional, to the increment of the distance is caused to apply thereto.

Further, in the case where sounds from two objects or more are adapted to be delivered to at least two speakers of the client computer 2, an approach is employed to control sound volume or localization (the localization referred to here is the place where the ornamental sound is produced within the virtually actualized space) by information of distances from the virtual user US up to these two objects or more within the virtually actualized space and the positional relationship thereof. By employing such an approach, the positional relationship between the objects and the virtual user US within the virtually actualized space can be represented by sound.

Figure 5:
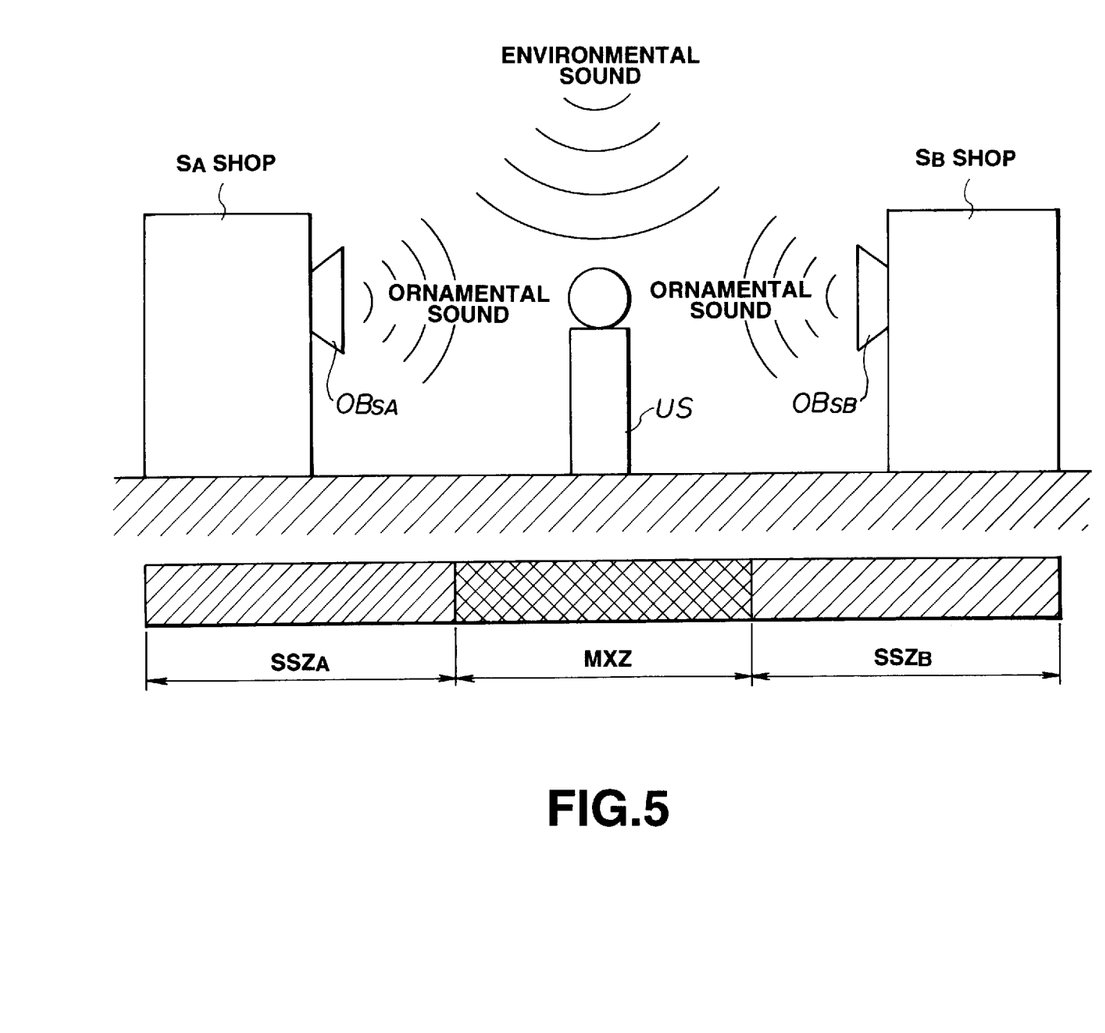
FIG. 5 is a view explaining a sound image within the virtually actualized space.

Such representation by sound is very effective within the virtually actualized space like an arcade in the shopping center, for example. Namely, in the case where, e.g., different BGMs are set as the ornamental sound by respective plural shops $S_A$, $S_B$ existing within the virtually actualized space as shown in FIG. 5, if BGMs from those respective shops $S_A$, $S_B$ are caused to be gradually varied in correspondence with the fact that the virtual user US moves within the virtually actualized space, it is possible to carry out representation of realistic space like an actual shopping center within the virtually actualized space, and it is also possible to indicate at the same time the existence of the shop even if that shop does not fall within the visual field. Moreover, to speak from the user side, such a representation assists him to recognize that he is approaching the shop. In this example, within the virtually actualized space shown in FIG. 5, shop sound zones $SSZ_A$, $SSZ_B$ where sounds from respective shops $S_A$, $S_B$ are mainly heard and mixed zone MXZ where sounds from these respective shops $S_A$, $S_B$ are mixed (or the zone where no sound is heard) are provided.

If the virtually actualized space in which sound is also taken into consideration in addition to picture image displayed on the display 20 is constructed in a manner as described above, even in the case where the user is operating pointing device, etc., or is carrying out any other work, etc., it is possible to inform the user of information by sound in parallel to GUI. Further, if, e.g., a parameter called animation is provided with respect to the signal (signaling) sound or the announcement sound so that the sound corresponding to this parameter can be reproduced in an interruptive manner when any other sound processing is being processed, it is possible to inform the user, by the above-mentioned sound, of any urgent information matter (e.g., when the management server informs that the server shuts down, etc.), or the like. Accordingly, this results in a more effective attention.

In this case, respective sounds of the underlying sound, the ornamental sound, the signal (signaling) sound and the announcement sound are respectively used by themselves, or are used in combination, whereby a virtual sound space is realized within the previously described virtually actualized space. For the purpose of realizing the virtual sound (acoustic) space within the previously described virtually actualized space, the client computer 2 of FIG. 2 generates signals of respective sounds to synthesize them as indicated by the functional block of FIG. 6.

Figure 6:
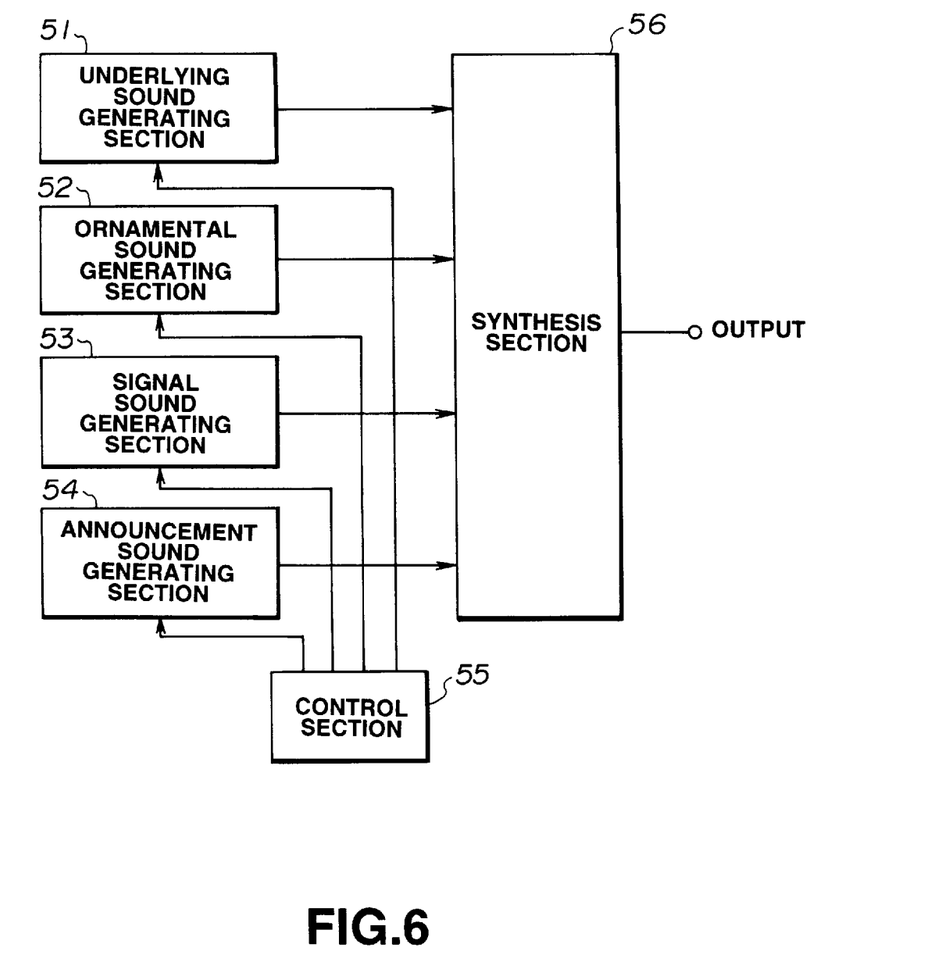
FIG. 6 is a functional block diagram for explaining functions within the client computer for realizing the virtual sound space.

The sound producing and synthesizing functional block of the client computer 2 shown in FIG. 6 is composed of an underlying sound generating section 51 which is the functional block for generating a signal (data train) of the underlying sound, an ornamental sound generating section 52 which is the functional block for generating a signal (data train) of the ornamental sound, a signal (signaling) sound generating section 53 which is the functional block for generating a signal (data train) of the signal (signaling) sound, an announcement sound generating section 54 which is the functional block for generating a signal (data train) of the announcement sound, a synthesis section 56 which is the functional block for synthesizing signals (data trains) of respective sounds delivered thereto, and a control section 55 for controlling the generation and the output of signals of respective sounds from the respective sound generating sections in accordance with the virtually actualized space displayed on the display 20, and for controlling the synthesis and output of sound signals in the synthesis section 56.

The control section 55 corresponds to the processing section 41 of FIG. 2, and the synthesis section 56 corresponds to the audio mixer 38 of FIG. 2. Moreover, the respective sound generating sections 51~53 correspond to the area for holding data of the respective sounds in the hard disc 43 and the memory 42 of FIG. 2. Namely, the processing section 41 serving as the control section 55 reads out respective sound data that the hard disc 43 and the memory 42 hold in accordance with the virtually actualized space displayed on the display 20, and to further control the audio mixer 38 to synthesize the respective sound data to allow the speaker 30 to output it. It is to be noted that the production (generation) and synthesis of the respective sounds corresponding to the virtually actualized space in the control section 55 (processing section 41) are carried out in accordance with the respective worlds or objects constituting the virtually actualized space, the parameters, and the operation of the virtual user, etc., as previously explained. Further, synthesis of respective sound data may be carried out by a software at the processing section 41.

As described above, in the system of the embodiment of this invention, management of sounds is carried out in the state where an attribute based on the Sound Scape Design is rendered thereto to reproduce those sounds in the state combined with position information, etc., within the virtually actualized space, thereby making it possible to carry out an offer of realistic sound field space, grasp of situations by sound, and efficient offer of information.

Moreover, in accordance with the system of the embodiment of this invention, the processing section 41 determines by calculation the positional relationship of the various objects or the mutual relationship with respect to set sound volumes within the virtually actualized space to use them as respective control parameters at the time of reproduction of sound to thereby realize realistic virtual sound (acoustic) space with good presence. Further, offer of information by sound can be made even with respect to the portion which is beyond the visual field of the virtual user within the virtually actualized space (offer of information which cannot be supported only by visual representation can be carried out). Thus, judgment of circumstances by sound can be made. For example, if the current access state is represented by sound under the network environment, in the case of carrying out distinction between a service which has buying sentiment and a service which does not have buying sentiment, or transmission/reception of a large quantity of data such as down load, etc., there is an advantage that the feeling of discomfort experienced by the user can be reduced, etc., even if it takes time to some extent. Further, the user can grasp the feeling of distance within the virtually actualized space by sound.

Furthermore, in such cases where communication between individual users takes place within the virtual space, the positional relationship therebetween can be more precisely grasped by the sound effect. Namely, this system can be utilized for communication by means except for visual sense. According to such an approach, e.g., it becomes possible to speak to a certain virtual user from the behind, or the like.

In addition, in accordance with the system of this embodiment, structured Sound Scape Design can be more easily carried out than within the actual space. Advise by sound is carried out by the on-line service, etc. , thereby making it possible to further enhance the advertisement effect.

Industrial Applicability

In accordance with this invention, at least the underlying sound representing situations of the place within the virtually actualized space and the ornamental sound corresponding to the object within the virtually actualized space which is independent of the presence or absence of the display on the display means are produced to set a virtual sound (acoustic) space corresponding to the virtually actualized space displayed on the display means. Thus, speech (sound) can be utilized as means for grasping spatial information as in the actual world within the virtually actualized space, and an offer of information utilizing speech (sound) can be carried out. In addition, the advertisement effect can be also increased.

We claim:

1. A sound producing apparatus adapted for setting a virtual sound space corresponding to a virtual space displayed on a display unit to produce a sound, the apparatus comprising:

underlying sound signal generating means for generating, on the basis of an underlying sound parameter, an underlying sound signal indicating situations of a place at a position of a virtual user within said virtual space;

ornamental sound signal generating means for generating, on the basis of an ornamental sound parameter, an ornamental sound signal set at an object disposed within the virtual space; and sound producing means for producing a sound on the basis of at least the underlying sound signal and the ornamental sound signal that the underlying sound signal generating means and the ornamental sound signal generating means respectively generate.

2. A sound producing apparatus as set forth in claim 1 further including communication means for making a connection to a server computer through a communication line, wherein data of the number of users who are providing access to a server computer is caused to be at least the underlying sound parameter.

3. A sound producing apparatus as set forth in claim 1 wherein the underlying sound parameter includes at least a time parameter.

4. A sound producing apparatus as set forth in claim 1 wherein the underlying sound signal is generated by repeatedly reproducing an underlying phonemic data consisting of a predetermined time length.

5. A sound producing apparatus as set forth in claim 1 wherein the underlying sound is set at every area of predetermined units of the virtual space.

6. A sound producing apparatus as set forth in claim 5 wherein the area of the predetermined unit corresponds to one virtual space displayed within a display picture (on screen) of a display unit.

7. A sound producing apparatus as set forth in claim 1 wherein the ornamental sound parameter includes at least a distance parameter indicating the distance between the virtual user and the object within the virtual space.

8. A sound producing apparatus as set forth in claim 1 wherein the ornamental sound parameter includes at least a direction parameter indicating the direction in which the object is disposed with respect to a line of sight direction of the virtual user within the virtual space.

9. A sound producing apparatus as set forth in claim 1 further including signaling sound signal generating means for generating a signaling sound signal corresponding to an alarm or a response on the basis of a signaling sound parameter.

10. A sound producing apparatus as set forth in claim 1 further including announcement sound signal generating means for generating an announcement sound signal having meanings in a language on the basis of an announcement sound parameter.

11. A sound producing method for setting a virtual sound space corresponding to a virtual space displayed on a display unit to produce a sound, the method comprising the steps of:

generating, on the basis of an underlying sound parameter, an underlying sound signal indicating situations of a place at a position of a virtual user within said virtual space;

generating, on the basis of an ornamental sound parameter, an ornamental sound signal set at an object disposed within the virtual space; and producing a sound on the basis of at least the underlying sound signal and the ornamental sound signal respectively generated at the underlying sound signal generating step and the ornamental sound signal generating step.

12. A sound producing method as set forth in claim 11 further including the step of establishing a connection to a server computer through a communication line wherein data of the number of users who are providing access to the server computer is caused to be at least the underlying sound parameter.

13. A sound producing method as set forth in claim 11 wherein the underlying sound parameter includes at least a time parameter.

14. A sound producing method as set forth in claim 11 wherein the underlying sound signal is generated by repeatedly reproducing an underlying phonemic data consisting of a predetermined time length.

15. A sound producing method as set forth in claim 11 wherein the underlying sound is set at every area of predetermined units of the virtual space.

16. A sound producing method as set forth in claim 15 wherein the area of the predetermined unit corresponds to one virtual space displayed within a display picture (on screen) of a display unit.

17. A sound producing method as set forth in claim 11 wherein the ornamental sound parameter includes at least a distance parameter indicating the distance between the virtual user and the object within the virtual space.

18. A sound producing method as set forth in claim 11 wherein the ornamental sound parameter includes at least a direction parameter indicating the direction in which the object is disposed with respect to a line of sight direction of the virtual user within the virtual space.

19. A sound producing method as set forth in claim 11 further including the step of generating a signaling sound signal corresponding to an alarm or a response on the basis of a signaling sound parameter.

20. A sound producing method as set forth in claim 11 further including the step of generating an announcement sound signal having meanings in a language on the basis of an announcement sound parameter.

21. A sound producing apparatus adapted for setting a virtual sound space corresponding to a virtual space displayed on a display unit to produce a sound, the apparatus comprising:

underlying sound signal generating means for generating, on the basis of an underlying sound parameter, an underlying sound signal indicating situations of a place at a position of a virtual user within a virtual space;

ornamental sound signal generating means for generating, on the basis of an ornamental sound parameter, an ornamental sound signal set at an object disposed within the virtual space; and sound producing means for producing a sound on the basis of at least the underlying sound signal and the ornamental sound signal that the underlying sound signal generating means and the ornamental sound signal generating means respectively generate;

wherein the underlying sound parameter includes at least a time parameter; and further wherein the ornamental sound parameter includes at least a distance parameter indicating the distance between the virtual user and the object within the virtual space.

22. The sound producing apparatus of claim 21 further including communication means for making a connection to a server computer through a communication line, wherein said underlying sound parameter further includes data related to the number of users who are providing access to said server computer.

23. The sound producing apparatus of claim 21 wherein the underlying sound signal is generated by repeatedly reproducing an underlying phonemic data consisting of a predetermined time length.

24. The sound producing apparatus of claim 23 wherein the underlying sound is set at every area of predetermined units of the virtual space, and further, wherein the area of the predetermined unit corresponds to one virtual space displayed within a display picture (on screen) of a display unit.

25. The sound producing apparatus of claim 21 further including signaling sound signal generating means for generating a signaling sound signal corresponding to an alarm or a response on the basis of a signaling sound parameter.

26. The sound producing apparatus of claim 21 further including announcement sound signal generating means for generating an announcement sound signal having meanings in a language on the basis of an announcement sound parameter.

27. A sound producing apparatus adapted for setting a virtual sound space corresponding to a virtual space displayed on a display unit to produce a sound, the apparatus comprising:

underlying sound signal generating means for generating, on the basis of an underlying sound parameter, an underlying sound signal indicating situations of a place at a position of a virtual user within said virtual space;

ornamental sound signal generating means for generating, on the basis of an ornamental sound parameter, an ornamental sound signal set at an object disposed within the virtual space; and sound producing means for producing a sound on the basis of at least the underlying sound signal and the ornamental sound signal that the underlying sound signal generating means and the ornamental sound signal generating means respectively generate;

wherein the underlying sound parameter includes at least a time parameter; and further wherein the ornamental sound parameter includes at least a direction parameter indicating the direction in which the object is disposed with respect to a line of sight direction of the virtual user within the virtual space.

28. The sound producing apparatus of claim 27 further including communication means for making a connection to a server computer through a communication line, wherein said underlying sound parameter further includes data related to the number of users who are providing access to said server computer.

29. The sound producing apparatus of claim 27 wherein the underlying sound signal is generated by repeatedly reproducing an underlying phonemic data consisting of a predetermined time length.

30. The sound producing apparatus of claim 29 wherein the underlying sound is set at every area of predetermined units of the virtual space, and further, wherein the area of the predetermined unit corresponds to one virtual space displayed within a display picture (on screen) of a display unit.

31. The sound producing apparatus of claim 27 further including signaling sound signal generating means for generating a signaling sound signal corresponding to an alarm or a response on the basis of a signaling sound parameter.

32. The sound producing apparatus of claim 27 further including announcement sound signal generating means for generating an announcement sound signal having meanings in a language on the basis of an announcement sound parameter.

33. A sound producing method for setting a virtual sound space corresponding to a virtual space displayed on a display unit to produce a sound, the method comprising the steps of:

generating, on the basis of an underlying sound parameter, an underlying sound signal indicating situations of a place at a position of a virtual user within said virtual space;

generating, on the basis of an ornamental sound parameter, an ornamental sound signal set at an object disposed within the virtual space; and producing a sound on the basis of at least the underlying sound signal and the ornamental sound signal respectively generated at the underlying sound signal generating step and the ornamental sound signal generating step;

wherein the underlying sound parameter includes at least a time parameter; and further wherein the ornamental sound parameter includes at least a distance parameter indicating the distance between the virtual user and the object within the virtual space.

34. The sound producing method of claim 33 further including the step of establishing a connection to a server computer through a communication line wherein said underlying sound parameter further includes data related to the number of users who are providing access to the server computer.

35. The sound producing method of claim 33 wherein the underlying sound signal is generated by repeatedly reproducing an underlying phonemic data consisting of a predetermined time length.

36. The sound producing method of claim 35 wherein the underlying sound is set at every area of predetermined units of the virtual space, and further, wherein the area of the predetermined unit corresponds to one virtual space displayed within a display picture (on screen) of a display unit.

37. The sound producing method of claim 33 further including the step of generating a signaling sound signal corresponding to an alarm or a response on the basis of a signaling sound parameter.

38. The sound producing method of claim 33 further including the step of generating an announcement sound signal having meanings in a language on the basis of an announcement sound parameter.

39. A sound producing method for setting a virtual sound space corresponding to a virtual space displayed on a display unit to produce a sound, the method comprising the steps of:
generating, on the basis of an underlying sound parameter, an underlying sound signal indicating situations of a place at a position of a virtual user within said virtual space;
generating, on the basis of an ornamental sound parameter, an ornamental sound signal set at an object disposed within the virtual space; and
producing a sound on the basis of at least the underlying sound signal and the ornamental sound signal respectively generated at the underlying sound signal generating step and the ornamental sound signal generating step;
wherein the underlying sound parameter includes at least a time parameter, and further
wherein the ornamental sound parameter includes at least a direction parameter indicating the direction in which the object is disposed with respect to a line of sight direction of the virtual user within the virtual space.

40. The sound producing method of claim 39 further including the step of establishing a connection to a server computer through a communication line wherein said underlying sound parameter further includes data related to the number of users who are providing access to the server computer.

41. The sound producing method of claim 39 wherein the underlying sound signal is generated by repeatedly reproducing an underlying phonemic data consisting of a predetermined time length.

42. The sound producing method of claim 41 wherein the underlying sound is set at every area of predetermined units of the virtual space, and further, wherein the area of the predetermined unit corresponds to one virtual space displayed within a display picture (on screen) of a display unit.

43. The sound producing method of claim 39 further including the step of generating a signaling sound signal corresponding to an alarm or a response on the basis of a signaling sound parameter.

44. A sound producing method of claim 39 further including the step of generating an announcement sound signal having meanings in a language on the basis of an announcement sound parameter.

* * * * *